Figure 1:
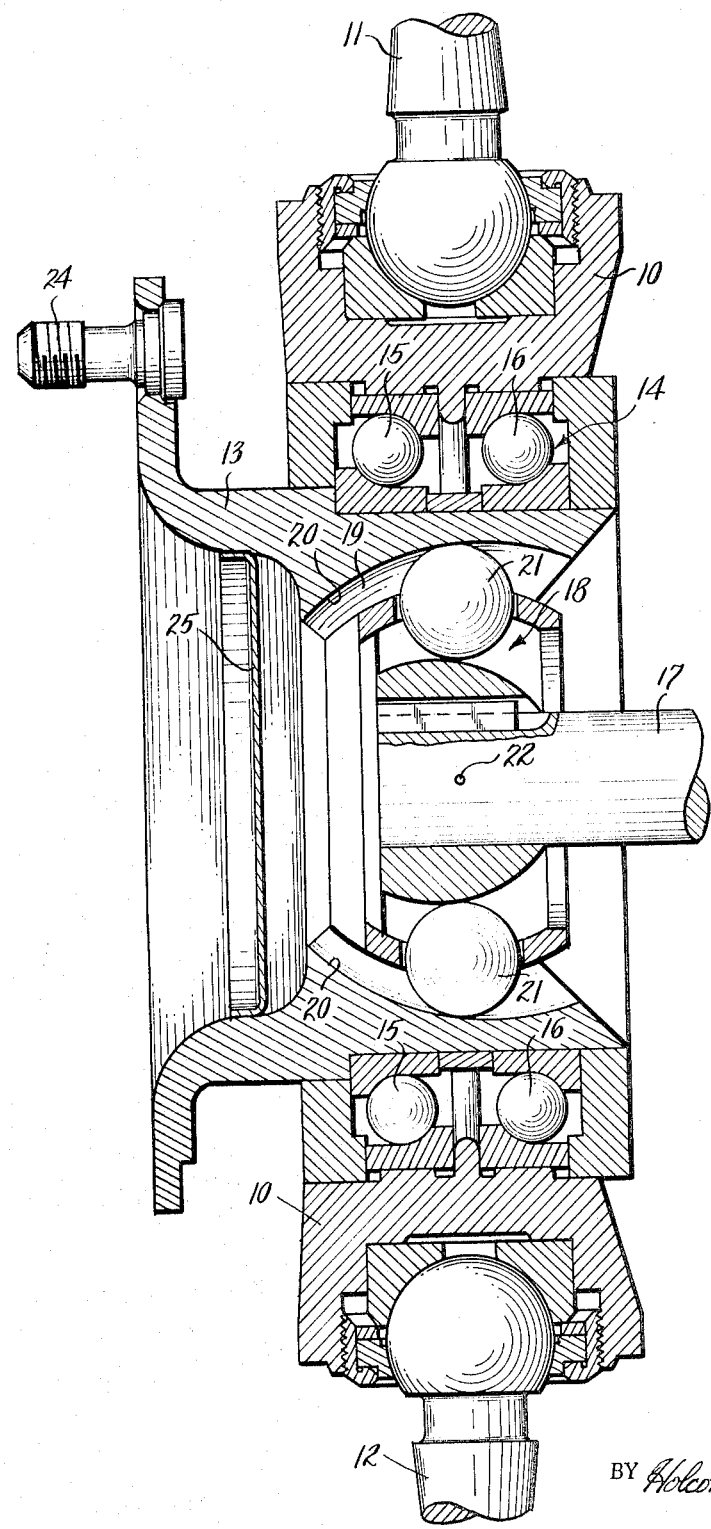

Jan. 3, 1967   J. G. CADIOU   3,295,626
WHEEL MOUNTING

Filed Oct. 5, 1964   2 Sheets-Sheet 1

INVENTOR
J. G. CADIOU

BY Holcombe, Wetherill & Brisebois
ATTORNEYS

United States Patent Office 3,295,626
Patented Jan. 3, 1967

3,295,626
WHEEL MOUNTING
Jean Georges Cadiou, Paris, France, assignor to
S. A. Andre Citroen
Filed Oct. 5, 1964, Ser. No. 401,601
Claims priority, application France, Oct. 3, 1963,
949,443, Patent 1,380,561
3 Claims. (Cl. 180—48)

The present invention relates to vehicles having a front wheel drive and front wheel steering in which the king-pin of each front wheel is mounted to oscillate about a substantially vertical axis and comprises an outer pivoting ring in which the hub carrying the wheel is rotatably mounted in a bearing, said hub being rotatable by a transmission shaft through the intermediary of a homokinetic joint.

According to a known embodiment of this type in which the homokinetic joint is a double universal joint, the hub is rigidly fixed to the driven shaft of the said joint by a series of screwed bolts in a transverse plate borne by said driven shaft. In this embodiment, the plate, the periphery of the wheel and the transverse median plane of the bearing are merged in a common plane which also contains the pivot axis while the center of the homokinetic joint is displaced inwards with respect to the said common plane. This arrangement has the particular disadvantage of not completely exploiting the angular variation permitted by the homokinetic joint since, for a given turning circle, the real angle at the joint increases with an increasing displacement between the center of the joint and the pivot axis of the wheel.

According to another known embodiment, in which the homokinetic joint is a ball-bearing joint of the RZEPPA type, a spindle is interposed between the hub and the homokinetic joint, one end of said spindle constituting the external casing of the said joint, while its other end is fixed to the hub by means of a splined fitting, which is locked by means of a screw. In this embodiment, the center of the homokinetic joint is placed on the pivot axis of the wheel but, on the other hand, the median plane of the bearing is moved with respect to said axle, which is harmful to the efficient operation of said bearing, and, on the other hand, there is the possibility of an angular clearance between the hub and the spindle, i.e., between the hub and the driven member of the homokinetic joint.

The invention has for a particular object the removal or minimisation of such angular clearance between the hub and the driven member of the homokinetic joint. Another object is to fix in a common vertical plane the median transverse plane of the roller-bearing and the median plane of the wheel rim, and also to arrange in the said common plane, the pivoting axis of the wheel as well as the center of the homokinetic joint. Another object is a simplification of the construction, as well as a saving in weight, space and the cost price of the wheel pivot.

The invention consists in a king-pin arrangement for a front wheel drive vehicle, comprising an external ring mounted pivotally about a substantially vertical axis, the hub carrying the wheel being mounted to be rotatably driven by a transmission shaft through a homokinetic joint having an external casing integral with the hub carrying the wheel.

By means of this arrangement, any possibility of angular clearance between the driven member of the homokinetic joint and the hub is eliminated or substantially eliminated. The median transverse plane of the bearing and the median plane of the wheel rim can be, without difficulty, merged in a common plane also containing the pivot axis and the center of the RZEPPA joint.

Due to the decrease in the number of constituent parts, the construction of the assembly is simplified and the axial space needed is reduced in the same way as the weight and the cost.

Figure 2:
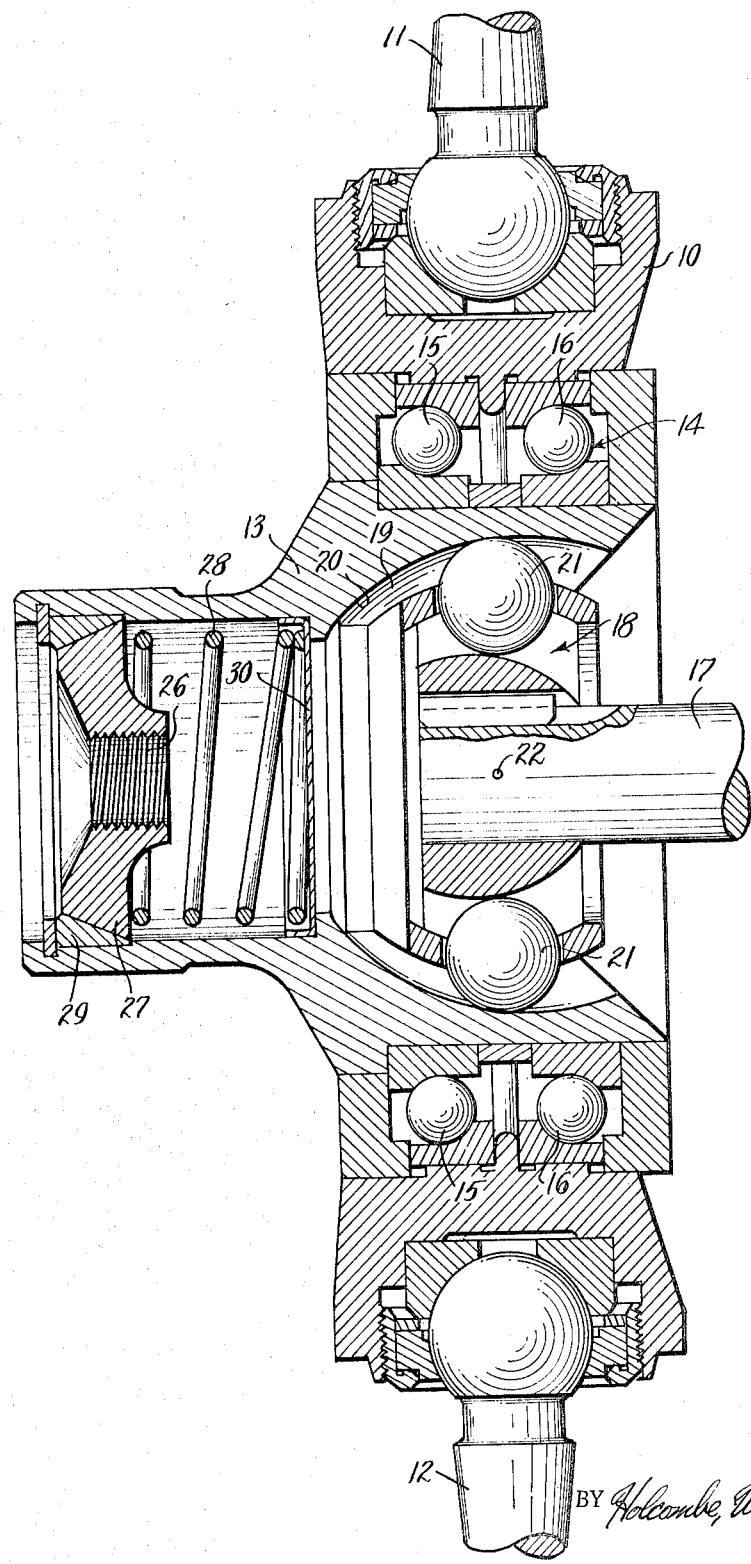

In order that the invention may be more clearly understood, reference will now be made to the accompanying drawings which show by way of example two embodiments thereof in which:

FIGURE 1 is an axial section of a king-pin arrangement according to the invention, in which the coupling of the wheel to the hub is effected by a plurality of angularly spaced threaded bolts, and FIGURE 2 is an axial section of another king-pin arrangement according to the invention, in which the coupling of the wheel to the hub is effected by means of a single central screw.

According to the drawings, a king-pin assembly for a front-wheel drive motor vehicle includes an outer ring 10 fitted with two diametrically opposed ball joints 11 and 12 which define the oscillation axis of the pivot assembly. The hub 13 for receiving the wheel (not shown) is rotatably mounted in the ring 10 on a bearing 14, comprising two series of ball-bearings 15 and 16. The hub 13 is driven by a drive shaft 17, through a ball-bearing homokinetic joint 18 of the RZEPPA type.

According to the present invention, the hub 13 is in one piece with the external casing of the RZEPPA joint 18, said hub having for this purpose a central cavity 19, in which are arranged the usual races 20 for the balls 21 of the RZEPPA joint.

As is shown on the drawings, this arrangement allows the center 22 of the homokinetic joint and the pivot axis between ball joints 11–12 to be located in the transverse median plane of the bearing 14, while the median plane of the wheel (not shown) is also practically merged with the median plane of the bearing 14.

Therefore the real angle at the RZEPPA joint is decreased for a given turning circle of the wheels and the bearing 14 operates under the most favorable conditions. It will also be seen that a decrease in number of the constituent parts is caused by simplification of the construction, and a reduction of the axial space needed as well as of weight and the cost price. Any angular clearance between the hub and the driven member of the joint is clearly eliminated.

It will be observed that, according to FIGURE 1, the wheel is secured on the hub 13, in the usual way, by means of a plurality of angularly spaced threaded bolts 24 (only one of which is shown), while a plate 25, secured by force fit into the hub 13, ensures sealing between the exterior and the internal cavities of the hub. In a modification according to FIGURE 2, the wheel is secured on the hub 13 by means of a central screw (not shown), engaged in the threaded bore 26 of a socket member in the shape of a truncated cone 27, the wheel being biassed towards the exterior by a spiral spring 28 which is supported on a seat 29 arranged in the hub 13. A sealing plate 30 is also provided.

It will be apparent that these embodiments of the invention have been described only by way of example, and the scope of the invention is not limited to the details thereof, which may be modified in various respects, particularly as to the type of hub used and the sealing means.

What is claimed is:

1. A king-pin arrangement for a front wheel of a front wheel drive vehicle, said arrangement comprising a ring member, diametrically opposed ball-joints between which said ring member is pivotally mounted, and a homokinetic joint having an inner drive member for connection to a drive shaft and one-piece outer driven member which constitutes the hub of said wheel and on which said ring member is journalled, said driven member being mounted to pivot on said drive member about an axis transverse to said drive shaft and rotatably mounted within said ring member to turn in the plane of said ring member.

2. A king-pin arrangement as claimed in claim 1 in which said driving member carries a cage containing ball bearings through which said driven member is driven.

3. A king-pin arrangement as claimed in claim 1 in which said ring member carries bearing means in which said driven member is seated, the pivot axis of said ring, and the center of said homokinetic joint both lying in the transverse median plane of said bearing.

References Cited by the Examiner
UNITED STATES PATENTS

| | | | |
|---|---|---|---|
| 1,734,709 | 11/1929 | Bayley | 180—48 |
| 1,793,091 | 2/1931 | Hudson | 180—48 |
| 2,503,477 | 4/1950 | Gregory | 180—48 |
| 2,858,897 | 11/1958 | Sibley | 180—48 |
| 3,162,262 | 12/1964 | Ordorica | 180—43 |

KENNETH H. BETTS, *Primary Examiner.*